(12) United States Patent
Sloan (10) Patent No.: US 6,457,036 B1
(45) Date of Patent: Sep. 24, 2002

(54) SYSTEM FOR ACCURATELY PERFORMING AN INTEGER MULTIPLY-DIVIDE OPERATION

(75) Inventor: John L. Sloan, Arvada, CO (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/379,678

(22) Filed: Aug. 24, 1999

(51) Int. Cl.[7] .............................. G06F 7/52; G06F 7/38
(52) U.S. Cl. ........................................ 708/650; 708/553
(58) Field of Search .............................. 708/552, 553, 708/498, 504, 650, 651, 652, 653, 654, 655, 656, 530

(56) References Cited

U.S. PATENT DOCUMENTS

| | | | | |
|---|---|---|---|---|
| 5,454,011 A | * | 9/1995 | Shimoyoshi | 375/240 |
| 5,576,977 A | * | 11/1996 | Eskildsen | 702/190 |
| 5,732,389 A | * | 3/1998 | Kroon et al. | 704/223 |
| 5,808,924 A | * | 9/1998 | White | 708/313 |
| 6,178,186 B1 | * | 1/2001 | Baker et al. | 370/517 |

* cited by examiner

Primary Examiner—Chuong Dinh Ngo
(74) Attorney, Agent, or Firm—Patton Boggs LLP (57) ABSTRACT

A system for accurately and efficiently determining the result of an integer multiple-divide operation having the form of (A*B)/C is disclosed. If the values of A, B, and C provide for an easy solution (e.g., A, B, or C are zero, A equals C or B equals C, or A or B equals one), the result is directly computed. Otherwise, if the product of A and B would produce an overflow condition, A and/or B are scaled by a tracked number of bits so that the product of scaled A and B would fit in an integer variable of the current computing system. Then, the product of scaled or unscaled A and B is computed. If C is large compared to the calculated product of A*B, C is scaled to minimize the likelihood of a false zero as a result. Then, the result is scaled if required. Thus, the result of an integer multiple-divide operation having the form of (A*B)/C is efficiently determined according to the system for accurately and efficiently performing an integer multiply-divide operation.

20 Claims, 8 Drawing Sheets

SYSTEM FOR ACCURATELY PERFORMING AN INTEGER MULTIPLY-DIVIDE OPERATION

FIELD OF THE INVENTION

This invention relates to the processing of mathematical data, and more particularly to a system for accurately and efficiently performing an integer multiply-divide operation to perform calculations of the form (A*B)/C, whose intermediate product or quotient would exceed the largest or smallest value that can be handled by the processor, without the need for complex software or floating point hardware.

PROBLEM

Users and developers of applications and systems desire reliable, faster, and more accurate results in their calculations. Increasingly, highly numerical applications are being implemented for products using embedded microprocessors which lack the hardware to perform floating point calculations. An example would be data and voice network traffic switch hardware which must make calculations of the form (A*B)/C whose intermediate product or quotient would exceed the largest or smallest storable value.

For example, suppose the result of the computation ((80,000*100,000)/800,000) is desired. If the solution were to be coded in software in a typical manner, the first step of the computation would be to compute one of the following three possible intermediate results: (80,000*100,000), (80,000/800,000), or (100,000/800,000). However, in a processor using 32-bit integer-only arithmetic, the operation of (80,000*100,000) cannot be computed directly because the result, (8,000,000,000), is nearly double the largest possible quantity, (4,294,967,295), which can be held in an unsigned 32-bit binary quantity. Using integer-only arithmetic, (80,000/800,000) or (100,000/800,000) would yield zero for the same reason. Hence, there is no order in which the calculation can be performed that generates the correct final result. Yet, the final result of the computation ((80,000*100,000)/800,000) is 10,000, which can be easily held in a 32-bit unsigned integer quantity.

Previous approaches for determining such a multiply-divide result include using floating point hardware; and for a processor without floating point hardware, using complex software to emulate floating point operations which typically has a memory image that is large in size (too large for many applications). In addition to being complex, floating point emulation is too slow for certain real-time applications. What is needed is a less complex, fast and accurate method and apparatus for determining the result of integer calculations of the form (A*B)/C.

SOLUTION

The present system for accurately and efficiently performing an integer multiply-divide operation efficiently determines the result of a multiple-divide operation having the form of (A*B)/C and produces an approximate but relatively accurate result. If the values of A, B, and C provide for an easy solution (A, B, or C are zero; A equals C or B equals C; or A or B equals one), the result is directly computed. Otherwise, if the product of A and B produces an overflow condition, A and/or B are scaled by a tracked number of bits so that the product of scaled A and B would fit in an integer variable of the processor. Then, the product of scaled or unscaled A and B is computed. If C is large compared to the calculated product of A*B, C is scaled to minimize the likelihood of a false zero as a result. Then, the result is scaled if required. The system for accurately and efficiently performing an integer multiply-divide operation also provides for (1) returning the largest unsigned integer value if the result of the integer multiple-divide operation is larger than what can be stored in an unsigned integer variable; (2) returning an amount of scaling required to the returned product to produce an accurate result; and (3) rounding, truncating, or taking the floor value of the result. Thus, the result of a multiple-divide operation having the form of (A*B)/C is efficiently determined by the present system for accurately and efficiently performing an integer multiply-divide operation, with the computed result being at least a close approximation of the exact result that would be computed using more complex and costly comutation methods.

Embodiments of the present system for accurately and efficiently performing an integer multiply-divide operation include computer-readable medium containing computer-executable instructions for performing the method of the present system for accurately and efficiently performing an integer multiply-divide operation, and a computer system having a processor and memory and performing the method of the present system for accurately and efficiently performing an integer multiply-divide operation. An embodiment of the method of the present system for accurately and efficiently performing an integer multiply-divide operation provides for determining an integer result of the quotient of the product of an integer A times and an integer B divided by an integer C using integer multiplication and division. An embodiment of this method can be performed comprising the steps of: (a) scaling the integer A and the integer B if the integer product of the integer A times the integer B will cause an overflow condition; (b) calculating the integer product of the scaled integers A and B; and (c) dividing the product by the integer C to produce the integer result. In an embodiment, this method further performs the step of: (d) scaling the value of the integer C before performing step (c); and possibly further performs the step of: (d) scaling the product determined in step (c). In an embodiment of the present system for accurately and efficiently performing an integer multiply-divide operation, the resultant integer result is rounded, truncated, or set to a floor value of the integer result. In an embodiment of the present system for accurately and efficiently performing an integer multiply-divide operation, if the values of the integers A, B and C comprise a simplified solution; then the simplified solution is determined without performing steps (a), (b), and (c). In an embodiment of the system for accurately and efficiently performing an integer multiply-divide operation, when the integer result would exceed the largest value storable in an integer variable, the integer result is set to the largest storable integer value.

DETAILED DESCRIPTION

Figure 1:
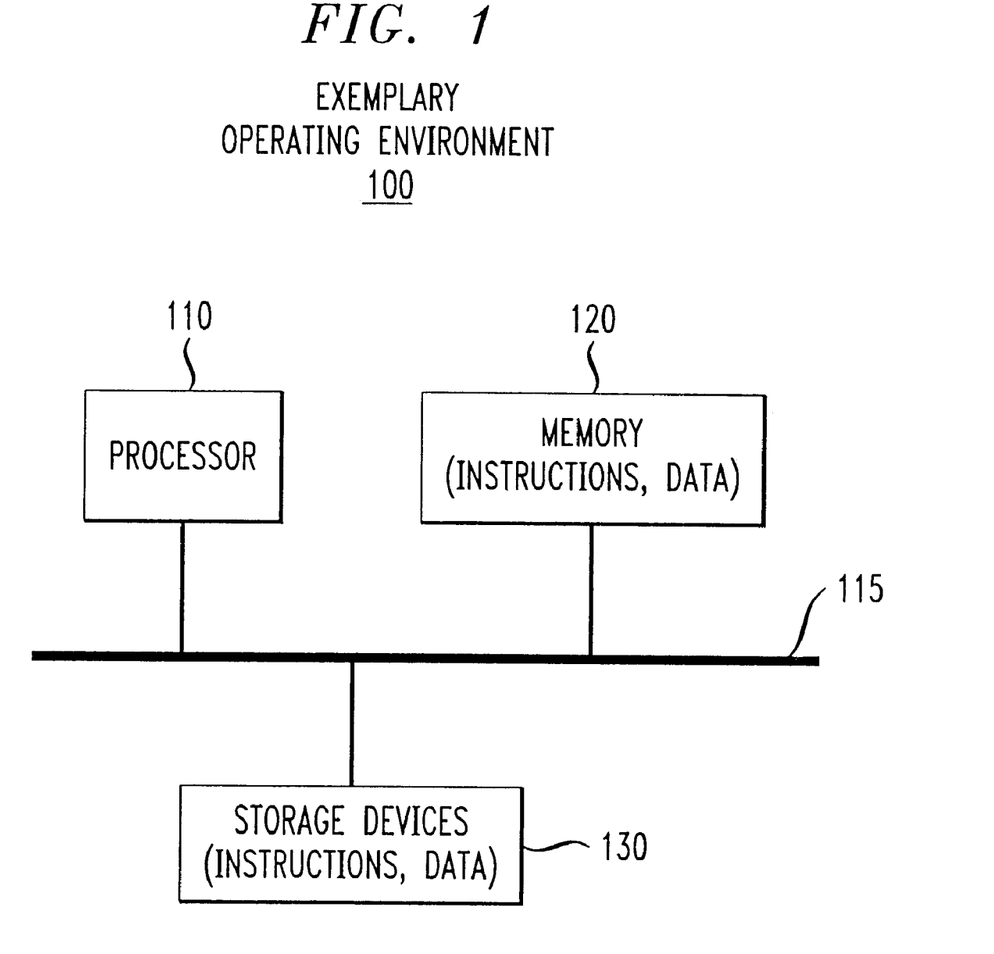
FIG. 1 is a block diagram of an exemplary operating environment in which the present system for accurately and efficiently performing an integer multiply-divide operation may be implemented.

FIG. 1 illustrates an exemplary operating environment 100 in which the present system for accurately and efficiently performing an integer multiply-divide operation may be implemented. Illustrated is a processor 110 which is electrically coupled to memory 120 and storage devices 130 via bus 115. Memory 120 is one type of computer-readable medium, and typically comprises random access memory (RAM), read only memory (ROM), integrated circuits, and/or other memory components. Memory 120 typically stores computer-executable instructions to be executed by processor 110 and/or data which is manipulated by processor 110. Storage devices 130 are another type of computer-readable medium, and typically comprise disk drives, diskettes, networked servers, tape drives, and other storage devices. Storage devices 130 typically store computer-executable instructions to be executed by processor 110 and/or data which is manipulated by processor 110.

FIG. 1 and its discussion herein are intended to describe a description of a general computing environment in which the present system for accurately and efficiently performing an integer multiply-divide operation may be implemented. The present system for accurately and efficiently performing an integer multiply-divide operation is not limited to any one computing environment. Rather, the system for accurately and efficiently performing an integer multiply-divide operation can be used in an unlimited number of computer and embedded system architectures, and can be used in an unlimited number of applications. For example, processor 110 could be part of a personal computer, a hand-held device such as a person data assistant (PDA), computer, cellular phone, communications network device, be a standalone processor, part of a network, minicomputer, mainframe consumer electronics, an embedded system, or the like as would be understood by one skilled in the art.

Figure 2:
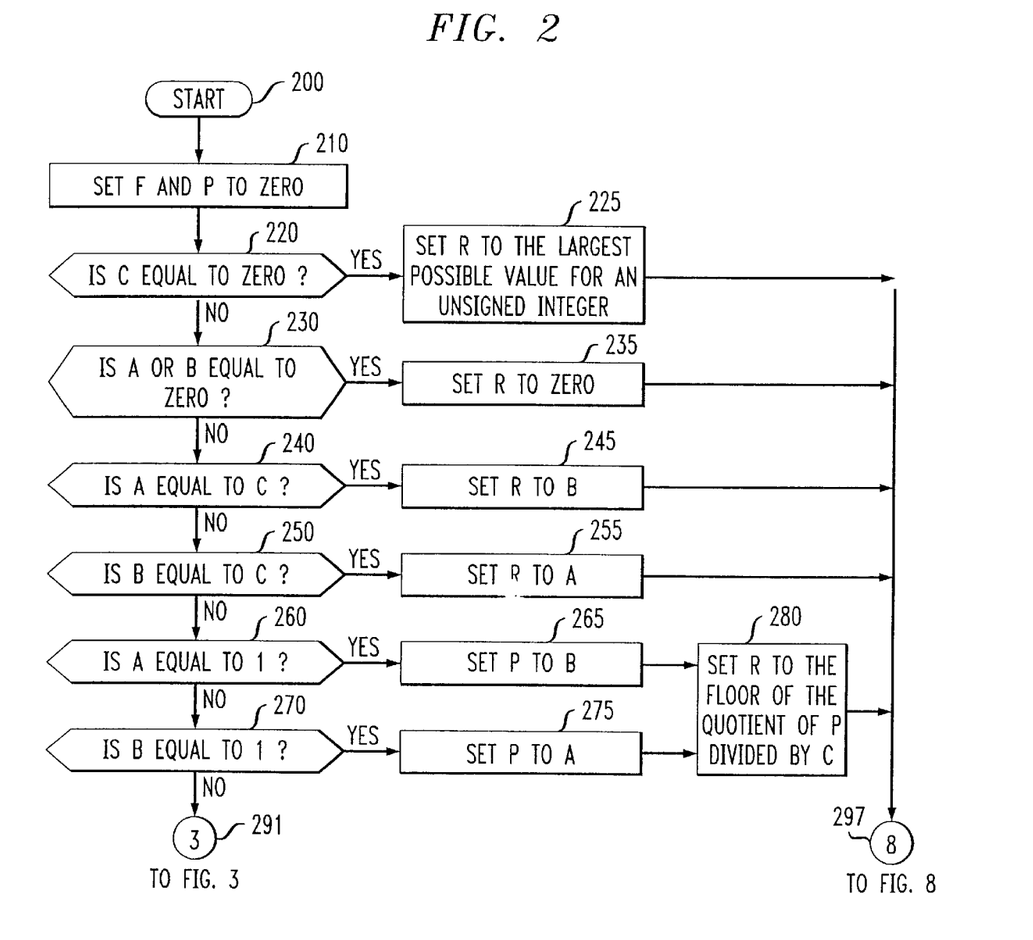
FIGS. 2–10 are flow diagrams illustrating an embodiment of the present system for accurately and efficiently performing am integer multiply-divide operation for determining the result of A multiplied by B divided by C, including for those cases in which A integer-multiplied by B would overflow, but A integer-divided by C or B integer-divided by C would yield zero.

FIGS. 2-10 are flow diagrams representing an embodiment of the present system for accurately and efficiently performing a multiply-divide operation for determining the result of A multiplied by B divided by C, including for those cases in which A integer-multiplied by B would overflow, but A integer-divided by C or B integer-divided by C would yield zero. In FIG. 2, all of the simple cases are handled. These include dividing by zero, multiplying by zero, dividing a number by itself, and multiplying by one. Processing of FIG. 2 begins with step 200, and proceeds in step 210 to initialize to zero the values of partial result variable P and result variable R. If dividing by zero (step 220: C equals zero), the result R is set to the largest possible unsigned integer number (step 225). If multiplying by zero (step 230: either A or B equals zero), the result R is set to zero (step 235). If dividing a number by itself (steps 240 or 250: either A or B equals C), the result R is set to the other multiplier (B or A respectively, steps 245 or 255). If multiplying by one (steps 260 or 270: either A or B equals one), the partial result P is set to the other multiplier (B or A respectively, steps 265 or 275), the result R is set to the floor of the quotient of P divided by C (step 280). All of these then lead to FIG. 8, where final result processing is performed (described hereinafter). If none of these simple cases are true, then the processing proceeds to FIG. 3.

Figure 3:
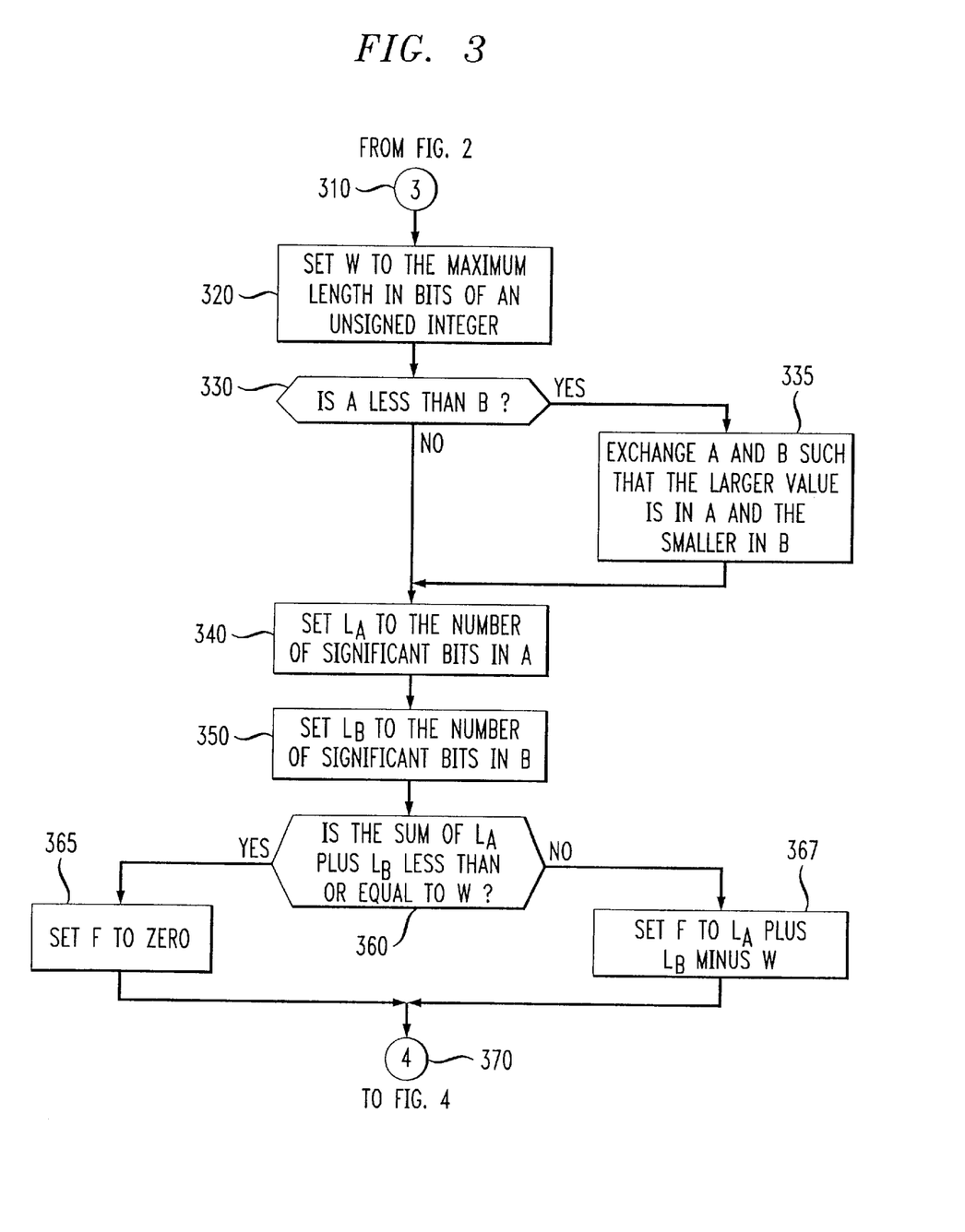

In FIG. 3, variable W is set to the maximum number of bits that can be held in an integer word (step 320). The multipliers A and B are conditionally swapped so that the larger of the two values is in A and the smaller is in B (steps 330 and 335). Then the system for accurately and efficiently performing an integer multiply-divide operation determines if the product of A multiplied by B will overflow by checking to see if the number of significant bits in A ($L_a$) plus the number of significant bits in B ($L_B$) is larger than W, the number of bits in a word (steps 340 through 360). If the answer is no, then F, which is the number of bits of overflow, is set to zero (step 365). If the answer is yes, then F is set to the $L_A$ plus $L_B$ minus W (step 367). Then processing proceeds to FIG. 4.

Figure 4:
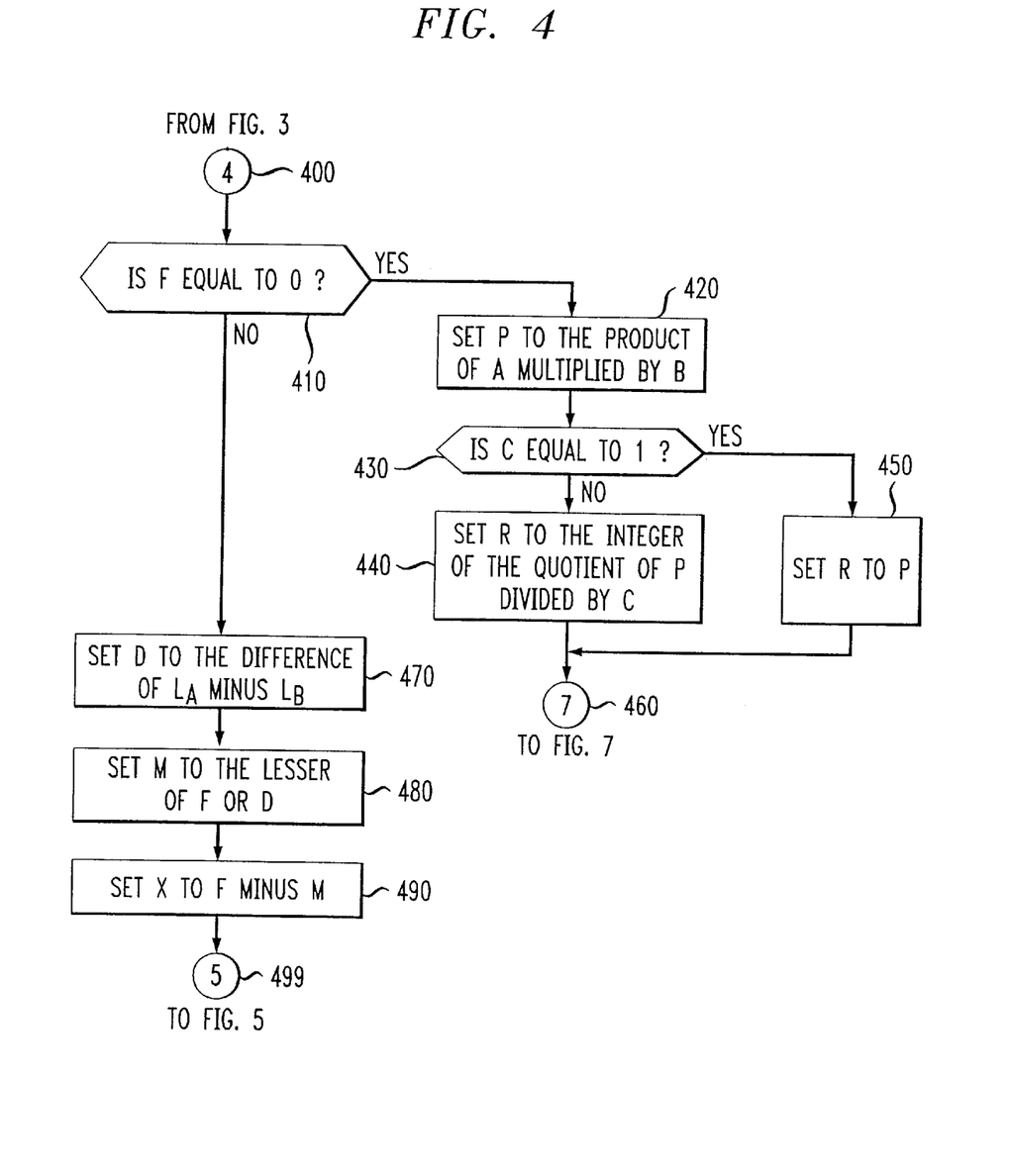

In FIG. 4, the embodiment of the system for accurately and efficiently performing an integer multiply-divide operation checks to see if F is equal to zero (step 410). If it is, then the multiplication can be performed without overflowing, so the system for accurately and efficiently performing an integer multiply-divide operation sets the partial result P to the produce of A multiplied by B (step 420). The system for accurately and efficiently performing an integer multiply-divide operation then checks to see if C is equal to one (step 430). If so, then the result R is set to the partial result P (step 450) and the processing proceeds to FIG. 7. If not, the result R is set to the partial result P divided by C (step 440), and the processing proceeds to FIG. 7. If F is not equal to zero, then D is set to the number of significant bits in length that A is larger than B, which is $L_A$ minus $L_B$ (step 470). M is set to the lesser value of F, the number of bits of overflow, or D, the number of bits that A is larger than B (step 480), and X is set to F minus M (step 490). X now represents the number of bits the system for accurately and efficiently performing an integer multiply-divide operation must scale the result by to avoid overflow. The processing then proceeds to FIG. 5.

Figure 5:
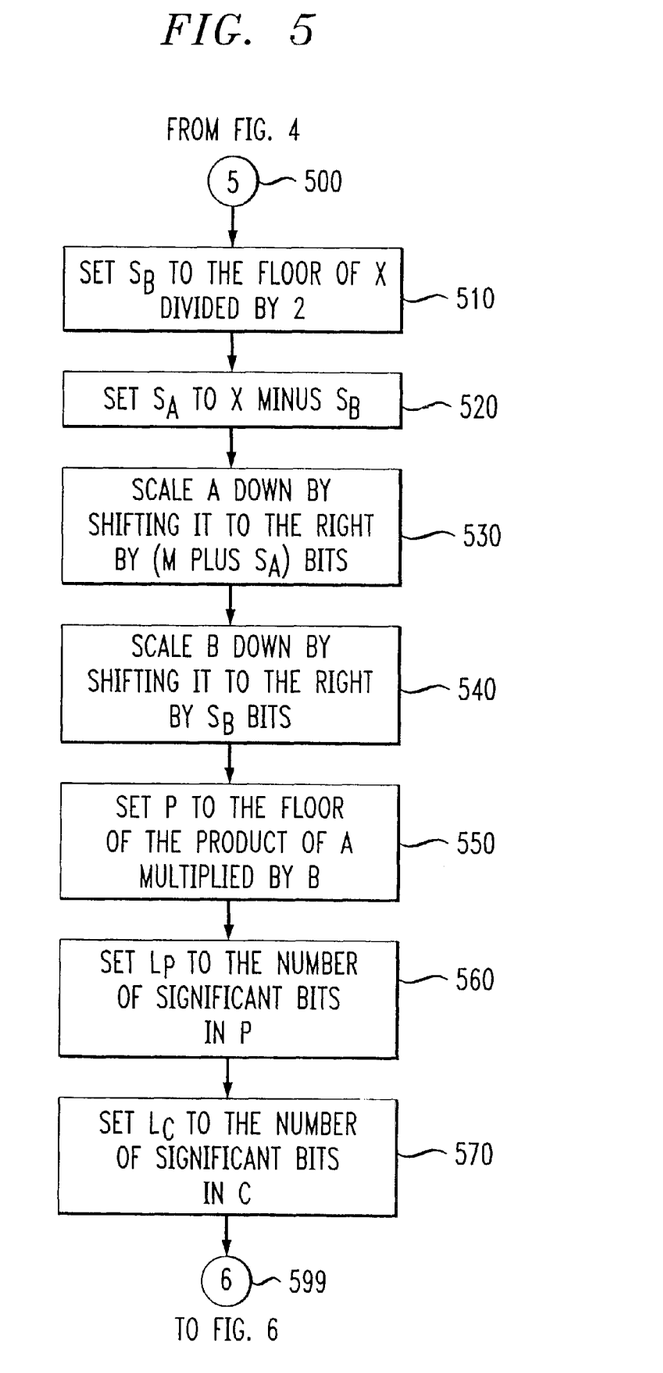

In FIG. 5, the scaling of the multipliers A and B are performed such that they can be multiplied together without overflow, and the multiplication is completed. $S_B$ is set to the floor of W divided by 2 (step 510). $S_B$ represents the number of bits by which B is scaled. $S_A$ is set to X minus $S_B$ (step 520). $S_A$ represents the number of bits by which A is scaled. Note that the larger of the values, which is in A, is scaled by the largest amount. This retains as much accuracy in the final result as possible. Scale A by shifting it to the right by (M plus $S_A$) bits (step 530). Scale B by shifting it to the right by $S_B$ bits (step 540). Set the partial result P to the product of A multiplied by B (step 550). Set $L_P$ to the number of significant bits in the partial result P (step 560). Set $L_C$ to the number of significant bits in the divisor C (step 570). The processing then proceeds to FIG. 6.

Figure 6:
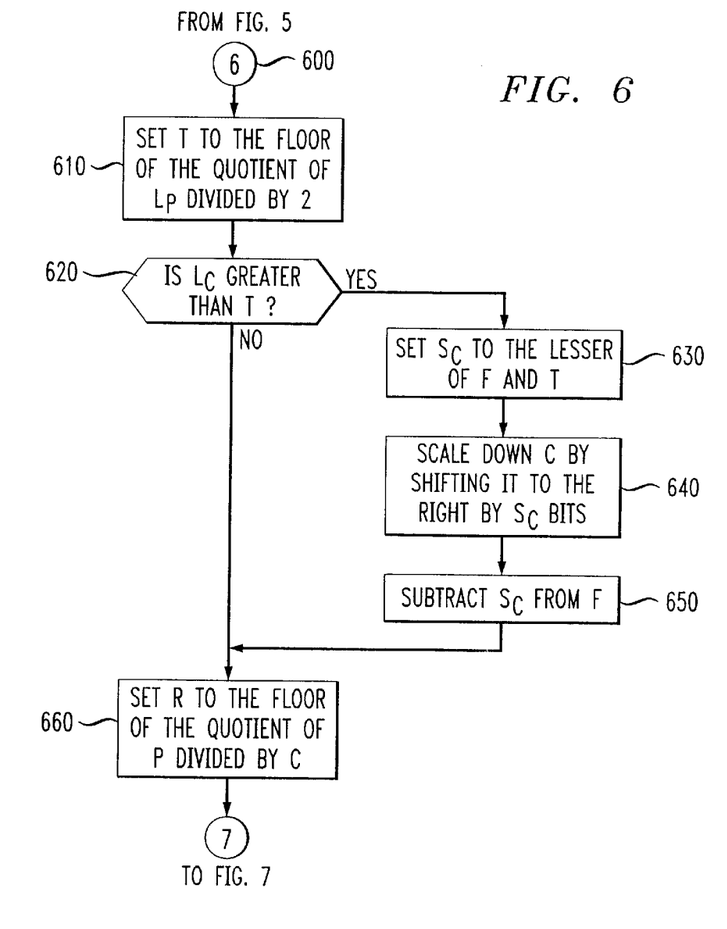

In FIG. 6, the scaling of the divisor C is performed such that the maximum integer precision can be maintained after the divide, and the divide is completed. The system for accurately and efficiently performing an integer multiply-divide operation first sets T to the floor of the quotient of $L_P$, the number of significant bits in the partial result P, divided by 2 (step 610). It then checks to see of $L_C$ is greater than T (step 620). This is done to decide how to scale the divisor C. If C has a small number of significant bits, then scaling it too much will reduce it to zero or at least reduce the accuracy of the final result. If C is large compared to the partial result P, then the division of P by C could result in zero. The check for $L_C$ being greater than T is a heuristic that yields good results is most cases. If $L_C$ is not greater than T, the processing proceeds to step 660. If $L_C$ is greater than T, the system for accurately and efficiently performing an integer multiply-divide operation scales C. First, $S_C$ is set to the lesser value of F and T (step 630). Then C is scaled by shifting it to the right by $S_C$ bits. $S_C$ is subtracted from F (step 660), reducing F by the number of bits by which C was scaled, so that F now contains the number of bits by which the final result must be scaled up to obtain the actual desired value. The processing proceeds to FIG. 7.

Figure 7:
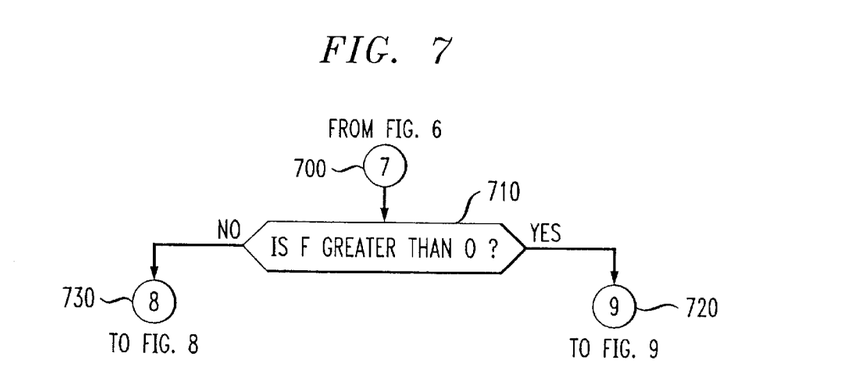

In FIG. 7, the system for accurately and efficiently performing an integer multiply-divide operation determines whether F is zero (step 710). If it is, then the entire result fits in a word (no overflow), and the system for accurately and efficiently performing an integer multiply-divide operation may have the option of post processing the result by rounding or ceiling it up to the next larger integer value. If this is the case, the system for accurately and efficiently performing an integer multiply-divide operation proceeds to FIG. 8. Otherwise, it proceeds to FIG. 9.

Figure 8:
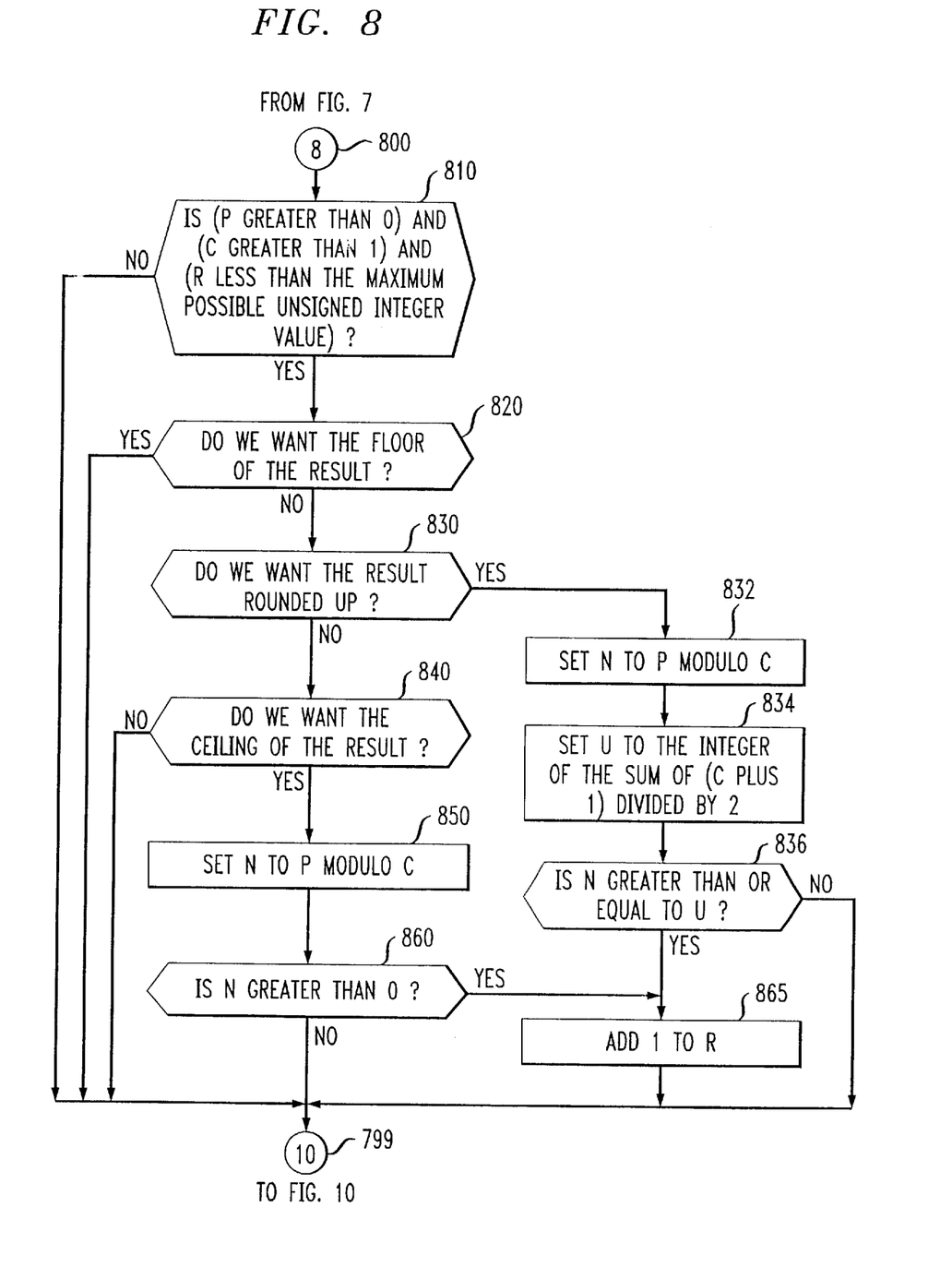

In FIG. 8, the final result may be post processed. If the partial result P is greater than zero and the divisor C is greater than one, and the final result R is less then the maximum possible integer value (step 810), then the embodiment can consider the possibility of rounding up or ceiling up R to the next larger integer value, if such a calculation was requested by the user of the embodiment. If the user asked for the floor of the result (step 820), then nothing is done. If the user asked for the result to be rounded up if the remainder of the divide was greater than one-half (step 830), then the embodiment sets N to the modulo (remainder) of P divided by C (step 832), sets U to the floor of the sum of (C plus one) divided by 2 (step 834), and then checks to see if N is greater than U (step 836). If so, then the remainder of the division is greater than one-half, and the result should be rounded up, so one is added to the final result R (step 865). If the user asked for the ceiling of the result, rounding up if the remainder is greater than zero (step 840), then the embodiment sets N to the modulo (remainder) of P divided by C (step 850). If N is greater than zero, then it adds one to the final result R (step 865). The processing proceeds to FIG. 9.

Figure 9:
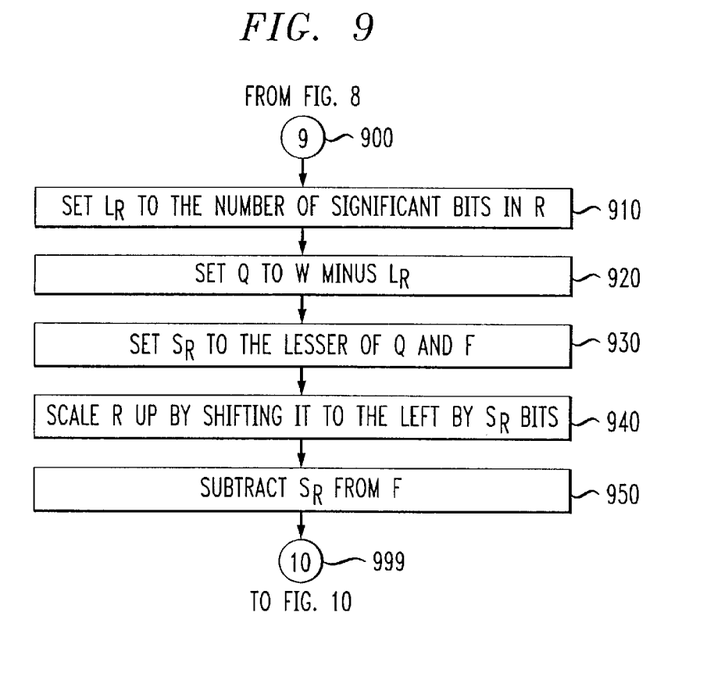

In FIG. 9, the system for accurately and efficiently performing an integer multiply-divide operation scales up the final result by the largest amount possible without overflowing so that it as close to the desired result is returned to the user. The system for accurately and efficiently performing an integer multiply-divide operation sets $L_R$ to the number of significant bits in the final result R (step 910). Q is set to W, the number of bits in a word, minus $L_R$ (step 920). $S_R$ is set to the lesser of Q and F (step 930). $S_R$ is the number of bits by which the system for accurately and efficiently performing an integer multiply-divide operation can scale up the final result R without overflow. The final result R is scaled up by shifting it to the left by $S_R$ bits (step 940). $S_R$ is subtracted from F (step 950). F now contains the remaining number of bits by which the final result would have to be shifted to the left to yield the true result (but it cannot be shifted by that amount without overflowing a word). If F equals zero, then the final result does not require further scaling. The processing proceeds to FIG. 10.

Figure 10:
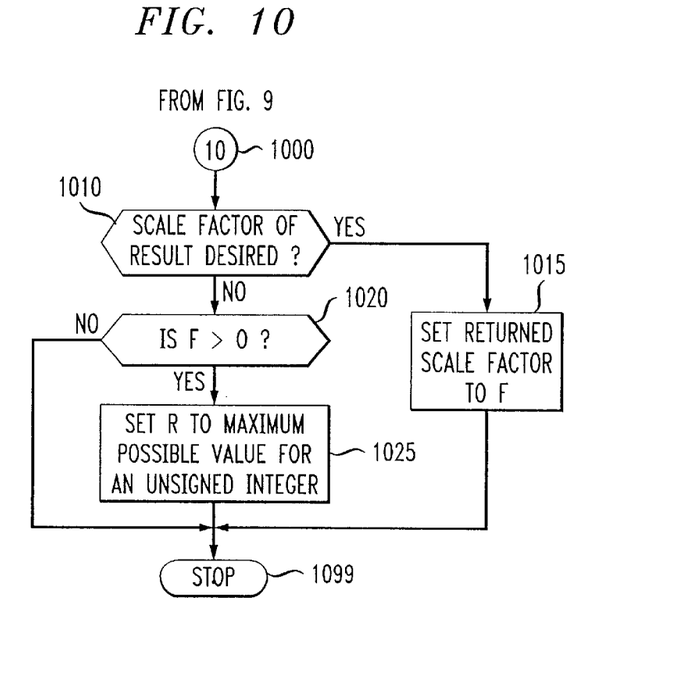

In FIG. 10, the system for accurately and efficiently performing an integer multiply-divide operation optionally returns the final scaling factor (now held in F) and the final result (in R) to the user. If the user requested the return of a scale factor (step 1010), both F and R is returned (step 1015). If the user did not request a scale factor, but F is non-zero, meaning that the final result R is not an accurate estimate (step 1020), then the final result R is set to the maximum possible unsigned integer value, and R is returned. This allows the user to choose between receiving a final result that might require further scaling, or a result that reflects that largest possible unsigned integer value that will fit in a word. The processing by the system for accurately and efficiently performing an integer multiply-divide operation is complete at this point.

In view of the many possible embodiments to which the principles of the system for accurately and efficiently performing an integer multiply-divide operation may be applied, it will be appreciated that the embodiment described herein with respect to the drawing figures is only illustrative and should not be taken as limiting the scope of the invention. To the contrary, the invention as described herein contemplates all such embodiments as may come within the scope of the following claims and equivalents thereof.

What is claimed is:

1. A system for performing an integer multiply-divide operation, executing on a processor, for determining an integer result of a quotient of an integer product of a first and a second integer divided by a third integer, the system for performing an integer multiply-divide operation comprising:

means for scaling said first and second integers if their product causes an overflow condition;

means for determining an integer product of said first and said second integers; and means for determining an integer quotient of said integer product divided by said third integer.

2. The system for performing an integer multiply-divide operation of claim 1, further comprising:

means for scaling said third integer.

3. The system for performing an integer multiply-divide operation of claim 1, further comprising:

means for scaling said integer product.

4. The system for performing an integer multiply-divide operation of claim 1, further comprising:

means for determining a simplified solution for said integer result.

5. In a computer system having a processor and memory but without floating point hardware, a method for determining an integer result of a quotient of an integer product of an integer A times and an integer B divided by an integer C using integer multiplication and division absent the use of complex software to emulate floating point operations, the method comprising the steps of:

scaling at least one of said integer A and said integer B if an integer product of said integer A times said integer B causes an overflow condition;

calculating an integer product of said scaled integers A and B; and dividing said integer product by said integer C to produce said integer result.

6. The method of claim 5, further performing the step of:

scaling the value of said integer C before performing said step of dividing.

7. The method of claim 6, further performing the step of:

scaling the value of said integer product determined in said step of dividing.

8. The method of claim 7, wherein said integer result determined in said step of dividing is set to a rounded, truncated, or floor value of said integer result.

9. The method of claim 5, further comprising the steps of:

determining that the values of said integers A, B and C comprise a simplified solution;

determining said simplified solution to produce said integer result; and wherein said steps of scaling, calculating and dividing are not performed when the values of said integers A, B and C comprise said simplified solution.

10. The method of claim 5, wherein said integer result is set to the largest storable integer value when said integer result determined in said step of dividing produces an overflow condition.

11. The method of claim 5, further performing the step of:

scaling said integer product determined in said step of dividing.

12. The method of claim 5, wherein the integer result determined in said step of dividing is set to a rounded, truncated, or floor value of said integer result.

13. A computer-readable medium having computer-executable instructions for determining an integer result of a quotient of an integer product of an integer A times and an integer B divided by an integer C using integer multiplication and division, comprising:

scaling at least one of said integer A and said integer B if said integer product of said integer A times said integer B causes an overflow condition;

calculating said integer product of said scaled integers A and B; and     dividing said integer product by said integer C to produce said integer result.

14. The computer-readable medium of claim 13, having further computer-executable instructions for performing the step of:

scaling the value of said integer C before performing said step of dividing.

15. The computer-readable medium of claim 14, having further computer-executable instructions for performing the step of:

scaling said integer product determined in said step of dividing.

16. The computer-readable medium of claim 15, wherein said integer result determined in said step of dividing is set to a rounded, truncated, or floor value of said integer result.

17. The computer-readable medium of claim 13, having further computer-executable instructions for performing the step of:

determining that the values of said integers A, B and C comprise a simplified solution;

determining the simplified solution to produce said integer result; and     wherein said steps of scaling, calculating and dividing are not performed when the values of said integers A, B and C comprise said simplified solution.

18. The computer-readable medium of claim 13, wherein said integer result is set to the largest storable integer value when said integer result determined in said step of dividing produces an overflow condition.

19. The computer-readable medium of claim 13, having further computer-executable instructions for performing the step of:

scaling said integer product determined in said step of dividing.

20. The computer-readable medium of claim 13, wherein said integer result determined in said step of dividing is set to a rounded, truncated, or floor value of said integer result.

\* \* \* \* \*